March 29, 1938. J. C. McCUNE 2,112,424
ELECTRODYNAMIC AND PNEUMATIC BRAKE
Filed April 21, 1936
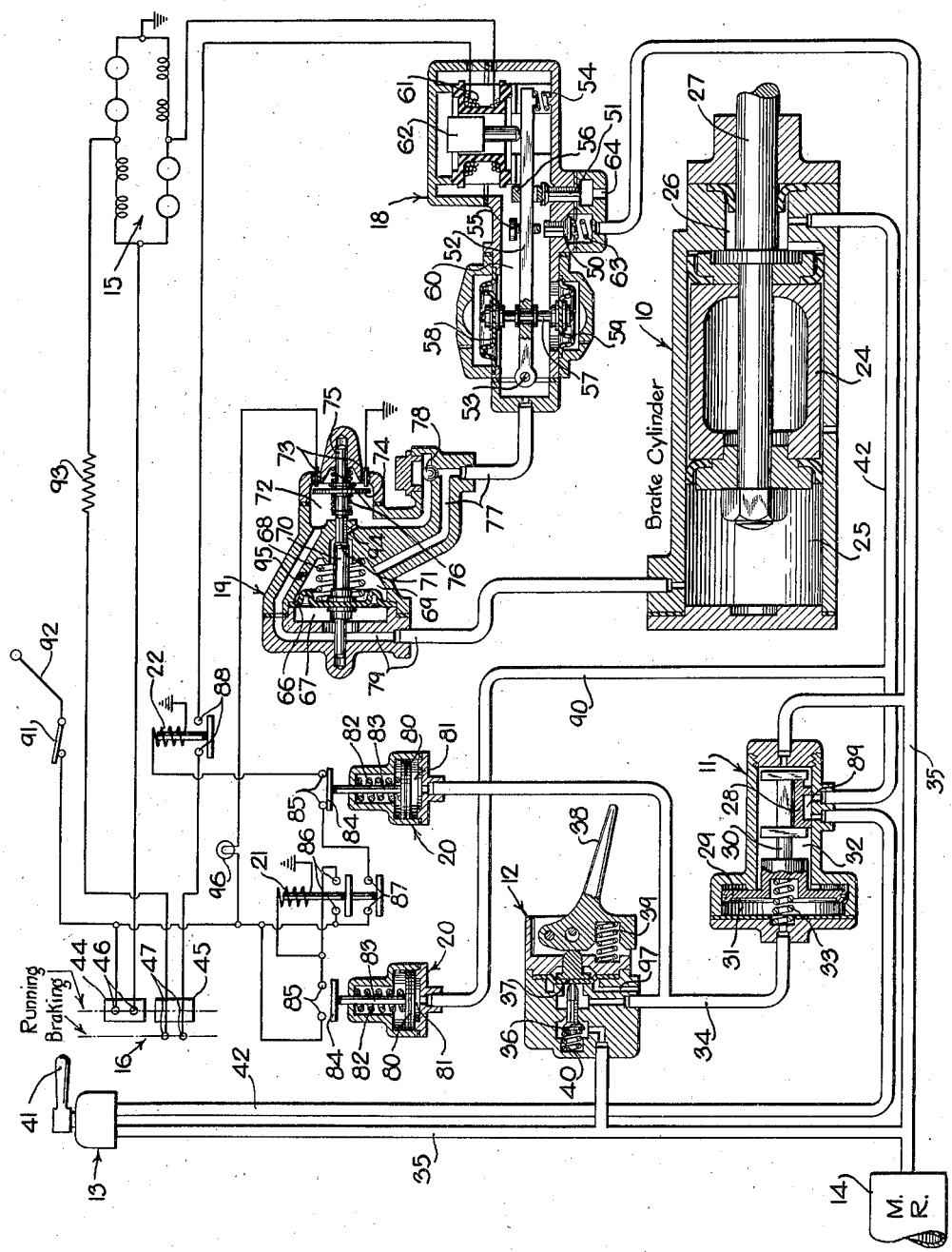
INVENTOR
JOSEPH C. McCUNE
BY Wm. M. Cady
ATTORNEY Patented Mar. 29, 1938

2,112,424

UNITED STATES PATENT OFFICE 2,112,424

ELECTRODYNAMIC AND PNEUMATIC BRAKE

Joseph C. McCune, Edgewood, Pa., assignor to The Westinghouse Air Brake Company, Wilmerding, Pa., a corporation of Pennsylvania Application April 21, 1936, Serial No. 75,539

25 Claims. (Cl. 303—3)

This invention relates to electrodynamic and pneumatic brakes, and more particularly to brakes of this character intended for traction and railway vehicles.

Where traction and railway vehicles are equipped with electric motors for propelling the vehicle it is common practice to employ such motors as dynamic brakes by disconnecting the motors from the source of power supply and reconnecting the motors as generators in a dynamic braking circuit. When the driving motors are thus operated very effective braking results.

However, as the speed of the vehicle diminishes the degree of braking produced by the motors also diminishes, first slowly and then rapidly, finally diminishing to zero as the vehicle comes to rest. In addition, if when the motors are connected in the dynamic braking circuit there should exist some defect, as broken wires, fault in the motors, etc., dynamic braking may not materialize. Because of these characteristics and possible contingencies, it is desirable and necessary that such vehicles be equipped also with an independent brake system. Such independent systems are more usually the well known pneumatic or fluid pressure brake system.

Where a vehicle is equipped with both fluid pressure and dynamic brakes it is desirable that the dynamic brakes be employed for making normal or service stops, and that the fluid pressure brakes be conditioned as a stand-by brake for supplementary or emergency purposes. It is a principal object of the present invention to provide a brake equipment employing a fluid pressure brake and a dynamic brake so interlocked that when a service application of the brakes is effected the dynamic brake will be the principal effective brake, with the fluid pressure brake suppressed so long as the dynamic brake is effective, but being instantly applied upon a failure of the dynamic brake, and in all cases at the end of the stop where the effectiveness of the dynamic brake diminishes due to the decrease in the speed of the vehicle.

In order to provide for fast application of the brakes and a high degree of reliability, it is desirable in brake systems such as that just referred to that the fluid pressure brakes be applied first to a predetermined low degree, and then the dynamic brakes applied in response to the application of the fluid pressure brakes, with the fluid pressure brakes thereafter suppressed so long as the dynamic brakes are effective in producing the desired degree of braking. It is therefore a further principal object of the present invention to provide a brake equipment of the character before referred to in which the dynamic brakes are not applied until the fluid pressure brakes will have been first applied to a predetermined low degree, and the fluid pressure brakes thereafter suppressed according to the degree of effectiveness of the dynamic brakes.

A further object of the invention is to provide a brake system of the character hereinbefore referred to in which the dynamic brakes are principally relied upon during service applications of the brakes, and in which the fluid pressure brakes only are applied and relied upon during emergency applications. To carry out this object the potential effectiveness of the fluid pressure brakes is made equal to or greater than the maximum effectiveness of the dynamic brakes, so that it is only necessary in emergency applications to apply the one brake, thus eliminating the danger of wheel sliding which would result if both brakes were simultaneously applied to a maximum degree each.

A yet further object of the invention is to provide a brake system of the character above mentioned which has incorporated therein the feature commonly referred to as "deadman control".

A still further object of the invention is to provide a brake equipment of the aforementioned character in which the danger of wheel sliding is greatly minimized and in which wheel sliding tends to be self corrective in the incipient stage. In addition, it is a still further object to provide means for warning the operator when wheels commence to slide.

Further objects and advantages of the invention dealing with novel arrangements of apparatus, and their interrelated functions, will be more fully understood from the following description, which is taken in connection with the single figure of the attached drawing showing in schematic and diagrammatic form one embodiment of the invention with the parts in release or running position.

Referring now to this drawing, I have shown a fluid pressure brake system comprising a double acting brake cylinder 10, an emergency valve device 11, a foot valve device 12, a brake valve device 13, and a reservoir 14.

The dynamic brake system is represented diagrammatically by the vehicle driving motors 15 and a controller device 16.

The apparatus for interlocking the fluid pressure and dynamic brake systems may comprise a suppression valve device 18, an application control valve device 19, two pressure operated switch devices 20, and two electric relays 21 and 22.

Considering these devices now in detail, the double acting brake cylinder 10 is embodied in a casing or cylinder having a piston 24 subject on one side to pressure of fluid supplied to a chamber 25 and subject on the other side to pressure of fluid supplied to a chamber 26. Attached to the piston is a stem 27 which is adapted when the piston 24 is moved to operate a conventional type of wheel brake mechanism, not shown because well known to those skilled in the art.

When fluid under pressure is supplied to the chamber 26 to a degree sufficient to actuate piston 24 to the left the brakes will be applied, the degree of application corresponding to the pressure in chamber 26. Subsequently, if fluid under pressure is supplied to the chamber 25, the degree of braking will be reduced to that corresponding to the differential of pressure in chamber 26 above that in chamber 25.

The emergency valve device 11 is embodied in a casing containing a slide valve 28 operated by a piston 29. The piston 29 is provided with a stem 30 having collars thereon for engaging the slide valve 28.

The piston 29 is subject on one side to fluid pressure in a chamber 31 and on the other side to fluid pressure in a slide valve chamber 32. A spring 33 biases the piston to a right hand position when these pressures are balanced. The piston chamber 31 is connected to a normally charged pipe 34, while the slide valve chamber 32 is connected to a main reservoir pipe 35, which is in constant open communication with the main reservoir 14.

The foot valve device 12 is embodied in a casing provided with a supply valve 36 and a diaphragm release valve 37. When pressure is manually applied to a foot pedal 38 so as to move the foot pedal downwardly, the diaphragm valve 37 is actuated to seated position and the supply valve 36 to unseated position. When the pressure manually applied to the foot pedal is released a spring 39 rotates the foot pedal upwardly, and a valve spring 40 seats the supply valve 36 and unseats the diaphragm valve 37.

The brake valve device 13 may be one of the standard rotary valve types, in which a rotary valve is operated by a handle 41. It is to be understood that in release position of the handle 41 a brake application or straight air pipe 42 is connected to the atmosphere, and in lap position of the handle this communication is interrupted. In application position of the handle the straight air pipe 42 is connected to the main reservoir pipe 35.

The dynamic brakes 15, which are the vehicle driving motors reconnected as generators, preferably comprise all of the driving motors of the vehicle. These may be connected in different arrangements during braking, one preferred arrangement being shown in the drawing.

The controller device 16, which is shown only in diagrammatic form in the drawing, essentially comprises two contact segments 44 and 45, which are adapted to be shifted between a "running" and a "braking" position by a handle (not shown). In the running position of the handle the contact segment 44 connects together two contact fingers 46. In the braking position of the handle this connection is interrupted, and the contact segment 45 connects together two contact fingers 47.

The suppression valve device 18 is embodied in a casing having a supply valve 50 and a release valve 51. A lever 52 is provided for operating these two valves. This lever is pivotally mounted at one end on a pin 53 and is urged in a counter-clockwise direction by a light spring 54 at the other end. Intermediate its ends the lever 52 is provided with an adjusting screw 55 for engaging the stem of supply valve 50, and also has disposed thereon a collar 56 attached to the release valve 51.

Extending transversely of the lever 52 is a stem 57 secured at one end to a diaphragm 58 and at the other end to a diaphragm 59. As illustrated, these two diaphragms are subject on their innermost sides to pressure of fluid supplied to a chamber 60, and on their outermost side to atmospheric pressure.

Disposed adjacent the free end of the lever 52 is an electromagnet 61 having a core or plunger 62 disposed therein and engaging the free end of the lever. When the electromagnet 61 is energized the core or plunger 62 is attracted downwardly, thus rotating the lever 52 in a clockwise direction and first seating the release valve 51 and then unseating the supply valve 50 against opposition of its spring 63. Fluid under pressure may then flow from the main reservoir pipe 35 to the chamber 60, and the pressure of this fluid acts upon the two diaphragms 58 and 59. The diaphragm 58 is larger than the diaphragm 59, so that the preponderance of pressure acting on the diaphragm 58 rotates the lever 52 in a counter-clockwise direction until the supply valve 50 is seated by its spring 63. The supply to the chamber 60 is thus cut off.

The parts are so designed that the degree of fluid pressure established in the chamber 60 is proportional to the degree of energization of the electromagnet 61. If the pressure tends to exceed this proportionality the lever 52 will be actuated upwardly to unseat the release valve 51 and permit fluid under pressure to escape to the atmosphere through the port 64 until the desired relation has been established.

The application control valve device 19 is embodied in a casing having a diaphragm 66 subject on one side to pressure of fluid in a chamber 67 and on the other side to the combined pressures of a spring 68 and fluid pressure in a chamber 69. Attached to the diaphragm 66 is a stem 70 terminating in a valve 71 which controls communication between the chamber 69 and an adjacent chamber 72.

Operable by the stem 70 is a contact mechanism comprising two stationary contacts 73 secured to and insulated from the valve device casing, and adapted to be bridged by a bridging contact 74 carried by and insulated from a slidable rod 75. The contact 74 is biased on this rod between two springs 76.

The aforementioned chamber 69 is in open communication with the chamber 60 in the suppression valve device 18 by way of pipe and passage 77, while a ball valve 78 permits one way communication between chamber 60 and the aforementioned chamber 72. The chamber 72 is, however, in open communication with the brake cylinder chamber 25 by way of pipe and passage 79.

Each of the pressure operated switch devices 20 is embodied in a casing having a piston 80 subject on one side to fluid pressure in a chamber 81 and on the other side to pressure of a spring 82. The piston 80 is provided with a stem 83 carrying a bridging contact 84 adapted to bridge two stationary contacts 85.

The electric relay 21 is provided with a winding which when energized effects closing of two sets of contacts 86 and 87. The electric relay 22 is similarly provided with a winding which when energized effects closing of a set of contacts 88.

The operation of this embodiment of my invention is as follows:

Operation

When the vehicle is running under power, or coasting, the brake valve device handle 41 is maintained in the release position. As before described, in this position of the brake valve handle the straight air pipe 42 is in communication with the atmosphere. The straight air pipe leads by way of cavity 89 in the emergency slide valve 28 to chamber 26 in the brake cylinder so that the fluid pressure brakes will be held released.

At the same time, pressure is manually applied to the foot pedal 38 so that the pipe 34 is maintained charged from main reservoir pipe 35. The right hand switch device 20 is connected to the pipe 34, so that contacts 85 of this switch device are maintained closed so long as the pipe 34 is charged. The other switch device 20 is connected to the straight air pipe 42 by way of branch pipe 90, so that the contacts of this switch device are open.

The handle of the controller device 16 is maintained in the running position, so that with the closing of a switch 91 power may be supplied to the driving motors 15 to drive the vehicle.

When it is desired to effect a service application of the brakes, the handle of the control device 16 is first thrown to the braking position, in which position contact segment 44 disengages from the contact fingers 46 to disconnect the driving motors from the trolley 92. Contact segment 45 then connects the contact fingers 47, to connect the driving motors in a dynamic braking circuit.

The brake valve handle 41 is then turned to the application position and left there until a pressure is established in the straight air pipe 42 to a degree sufficient to produce a service application of the brakes. Fluid under pressure in the straight air pipe flows to brake cylinder chamber 26, and to chamber 81 in the left hand switch device 20. In the brake cylinder the piston 24 will be actuated to the left to apply the wheel brakes, while in the switch device 20 when the pressure has reached a chosen value the contacts 85 will be closed. Closing of these contacts energizes the electric relay 21, from trolley 92, and causes this relay to close its contacts 86 and 87.

Closing of the contacts 86 merely provides a holding circuit for the relay, while closing of contacts 87 energizes the electric relay 22. This relay then closes its contacts 88 to fully establish the dynamic braking circuit, which includes resistance 93, contact fingers 47 and contact segment 45, contacts 88 of electric relay 22, and electromagnet 61 of the suppression magnet valve device 18. With the closing of the dynamic braking circuit the vehicle motors will then become operative as dynamic brakes.

When the electromagnet 61 in the suppression magnet valve device is energized, the lever 52 is actuated downwardly to seat the release valve 51 and unseat supply valve 50. Fluid under pressure then flows from the main reservoir pipe 35 to chamber 60, and from thence to the brake cylinder chamber 25. This flow from chamber 60 may take place past the ball valve 78, and through chamber 72 and pipe and passage 79, and in parallel therewith through passage 77, chamber 69, and a relatively small port 94. Since the pressure in the two chambers 67 and 69 will be substantially equal the position of the diaphragm 66 will be unchanged from that shown in the drawing.

When the pressure in chambers 60 and 25 corresponds to the degree of energization of the electromagnet 61, which energization corresponds to the degree of dynamic braking, lever 52 will be actuated upwardly to permit seating of supply valve 50.

Fluid pressure in brake cylinder chamber 25 acts upon piston 24 to move it to the right. It is preferred that for full effective operation of the dynamic brakes the pressure in chamber 25 will be sufficient to at least balance that in chamber 26 for a full service application, so that the fluid pressure brakes will be held substantially released while the dynamic brakes are effective in stopping the vehicle. It will, of course, be apparent that any other relation may be established by suitable adjustment or design of the suppression valve device 18. That is to say, if it is desired to have a concurrent application of the two brakes then the suppression magnet valve device may be so designed or adjusted.

Now as the vehicle slows down the current in the dynamic braking circuit will diminish due to the decrease in effectiveness of the dynamic brakes with decrease in the speed of the vehicle, so that the energization of the electromagnet 61 will diminish. As this takes place, lever 52 will be actuated upwardly by the pressure in chamber 60, and release valve 51 thus unseated. Fluid under pressure will then be released from the chamber 25, this release taking place through the small port 94 and a restricted port 95. Since the decrease of current in the dynamic braking circuit takes place gradually, the decrease of pressure in chambers 67 and 69 will take place at a like rate, so that the diaphragm 66 will not be subjected to a substantial differential of pressure, and will, therefore, remain in the position illustrated.

As the pressure in brake cylinder chamber 25 diminishes, piston 24 will move to the left and gradually apply to an increasing degree the wheel brakes. Thus it will be seen that as the vehicle slows down and the dynamic brakes decrease in effectiveness, the fluid pressure brakes will be increasingly applied to insure stopping of the vehicle and holding it at rest.

As the vehicle comes to a rest electromagnet 61 will be wholly deenergized and the fluid pressure brakes will be applied to the degree according to the manipulation of the brake valve handle 41.

If, while the dynamic brakes are effective, one or more wheels associated with the vehicle motors should begin to slip, then the current in the dynamic braking circuit will diminish. This diminution will, of course, take place rapidly and pressure in chamber 60 of the suppression valve device will likewise be correspondingly diminished rapidly. This will in turn cause a sharp decrease in pressure in chamber 69 in the application control valve device 19, so that the overbalancing pressure in chamber 67 will move diaphragm 66 to the right, thus seating the valve 71 and causing the bridging contact 74 to bridge the two stationary contacts 73. Bridging of these contacts will cause a signal device 96 to be operated so as to warn the operator of the wheel slipping condition. He may then take such action as seems appropriate. This signal device may be a lamp, indicating instrument, or similar device.

Seating of the valve 71 restricts the flow of fluid from the brake cylinder chamber 25 to the chamber 60 to that through the choke port 95, so that a predetermined interval of time will elapse before sufficient pressure has been released from brake cylinder chamber 25 to permit the fluid pressure brakes to be applied. Thus the application of the fluid pressure brakes is delayed for a time interval during which the wheel slipping condition may be corrected, because the inherent characteristics of the dynamic brakes are such as to correct the wheel slipping in the incipient stage, as is well known.

During a service application of the brakes, the operator maintains pressure applied to the foot pedal 38. If through accident or design, pressure manually applied to the foot pedal 38 is released the supply valve 36 will be seated and the diaphragm valve 37 unseated, to effect an emergency application of the brakes. Unseating of the diaphragm valve connects the charged pipe 34 to the exhaust port 97, so as to release fluid under pressure from this pipe.

The right hand switch device 20 will then open its contacts 85 so as to prevent operation of the vehicle motors as dynamic brakes, while in the emergency valve device 11 piston 29 will be shifted to the left by the overbalancing pressure in the slide valve chamber 32. This will shift the slide valve 28 to a position where the left hand portion of the straight air pipe 42 is blanked, and the right hand portion opened to the slide valve chamber. Fluid under pressure then flows direct from the main reservoir through the emergency valve device and the right hand portion of the straight air pipe to the brake cylinder chamber 26. Now since the dynamic brakes are not effective for this application, there will be no opposing pressure in the brake cylinder chamber 25, so that the fluid pressure brakes will be applied to a maximum degree. It will be apparent then that in effecting an emergency application of the brakes, the fluid pressure brakes only are applied and to a maximum degree.

To release the brakes following an emergency application, pressure is again manually applied to the foot pedal 38 so as to recharge the pipe 34. Piston 29 in the emergency valve device will then shift slide valve 28 to the illustrated position, and brake cylinder pressure may be released through the brake valve device 13, as when releasing following a service application.

The dynamic brakes can of course be released whenever desired by moving the handle of the controller device 16 from the braking position to the running position.

It will thus be seen that I have provided an electrodynamic and pneumatic brake system so interlocked as to provide for a high degree of both flexibility and reliability, and at the same time provide for control of each brake by the other in a manner such that prompt application and release of the brakes may be readily effected.

While I have described my invention with particular reference to one embodiment thereof, it is not my intention to be limited to the exact details of this embodiment, or otherwise than by the spirit and scope of the appended claims.

Having now described my invention what I claim as new and desire to secure by Letters Patent, is:

1. In a vehicle brake system, in combination, electric brake means, a fluid pressure operated brake device, means for establishing a communication through which fluid under pressure is supplied to effect operation of said fluid pressure operated brake device, and electroresponsive means responsive to operation of said electric brake means and being unaffected by fluid under pressure in said brake device, established as a result of supply through said communication, for controlling the effectiveness of the operation of said brake device.

2. In a vehicle brake system, in combination, a brake cylinder for actuating a friction brake and having a movable abutment subject on one side to fluid pressure in a first chamber and subject on the other side to fluid pressure in a second chamber, manually operated means for effecting a supply of fluid under pressure to said first chamber to effect an application of the friction brakes, and electroresponsive means operable when energized to effect a supply of fluid under pressure to said second chamber to control the degree of application of the friction brakes.

3. In a vehicle brake system, in combination, electric brake means, a friction brake operating device having a movable abutment subject on one side to fluid pressure in a first chamber and subject on the other side to fluid pressure in a second chamber, manually operated means for effecting a supply of fluid under pressure to said first chamber and for effecting the operation of said electric brake means to produce a braking effect, and means responsive to the effectiveness of said electric brake means for effecting a supply of fluid under pressure to said second chamber to suppress the degree of effectiveness of the brake operated by said brake operating device.

4. In a vehicle brake system, in combination, a brake cylinder having a piston subject on one side to pressure of fluid in a first chamber and subject on the other side to pressure of fluid in a second chamber, means for effecting a supply of fluid under pressure to said first chamber to apply the brakes, electroresponsive means operable to effect a supply of fluid under pressure to said second chamber according to the degree of energization thereof, and means for supplying current to said electroresponsive means dependent upon the speed of the vehicle.

5. In a vehicle brake system, in combination, a brake cylinder having a piston subject on one side to pressure of fluid in a first chamber and subject on the other side to pressure of fluid in a second chamber, means for manually effecting a supply of fluid under pressure to said first chamber to effect an application of the brakes, and a valve device having a winding and a pressure responsive abutment for controlling supply of fluid under pressure to said second chamber, said valve device being operable to establish fluid pressures in said second chamber according to the degree of energization of said winding, the degree of application of the brakes being in accordance with the differential of pressure between said first and second chambers.

6. In a vehicle brake system, in combination, a brake cylinder having a piston subject on one side to pressure of fluid supplied to a first chamber and subject on the other side to pressure of fluid supplied to a second chamber, means for manually effecting a supply of fluid under pressure to said first chamber to effect an application of the brakes, electroresponsive valve means operable to effect a supply of fluid under pressure to said second chamber according to the degree of energization thereof, and being operable upon a decrease in the degree of energization to effect a release of fluid under pressure from said second chamber, and valve means operable to permit supply of fluid under pressure to said second chamber at a relatively rapid rate and operable to restrict release of fluid under pressure from said second chamber to a relatively slow rate.

7. In a vehicle brake system, in combination, a brake cylinder having a piston subject on one side to pressure of fluid supplied to a first chamber and subject on the other side to pressure of fluid supplied to a second chamber, manually operated means for effecting a supply of fluid under pressure to said first chamber to effect an application of the brakes, electroresponsive means operable to effect a supply of fluid under pressure to said second chamber according to the degree of energization thereof to control the degree of application of the brakes, and operable upon a decrease in the energization thereof to effect a release of fluid under pressure from said second chamber, and a valve mechanism interposed between said electro-responsive means and said second chamber and operable upon a sudden decrease in the energization of said winding to restrict the rate of release of fluid from said second chamber.

8. In a vehicle brake equipment, in combination, an electrodynamic brake device, a brake cylinder for operating a friction brake, means for controlling operation of said electrodynamic brake device and supply of fluid under pressure to said brake cylinder, electroresponsive valve means for controlling a communication through which fluid under pressure is supplied to control the degree of effectiveness of operation of said brake cylinder, means for energizing said electroresponsive valve means to open said communication when said electrodynamic brake device is cut into action, and fluid pressure operated means operable upon a decrease in pressure for effecting deenergization of said valve means to close said communication.

9. In a vehicle brake equipment, in combination, an electric brake system, a fluid pressure brake system, means for controlling the operation of both of said brake systems, an electroresponsive valve device for controlling a communication through which fluid under pressure is supplied to control the degree of operation of said fluid pressure brake system, means for energizing said electroresponsive valve device to open said communication when said electric brake system is cut into action, and means responsive to the pressure of fluid supplied through such communication for causing said valve device to close said communication.

10. In a vehicle brake equipment, in combination, an electric brake system, a fluid pressure brake system, a pipe normally charged with fluid under pressure, electroresponsive means operative when said electric brake system is effective for controlling the operation of said fluid pressure brake system, said electroresponsive means being operable to progressively vary the degree of effectiveness of said fluid pressure brake system as the degree of effectiveness of said electric brake system progressively varies, and means operable upon reduction of pressure in said pipe for rendering said electroresponsive means ineffective to control the operation of said fluid pressure brake system.

11. In a vehicle brake equipment, in combination, an electric brake system, a fluid pressure brake system, manually operable control means for conditioning said two brake systems to be effective to produce a braking effect, an electroresponsive valve device for limiting the degree of application of said fluid pressure brake system in accordance with the degree of energization thereof when said electric brake system is operated, a pipe normally charged with fluid under pressure, and means responsive to reduction of pressure in said pipe for effecting an application of said fluid pressure brake system to a maximum degree.

12. In a vehicle brake system, in combination, a brake cylinder, means for supplying fluid under pressure to said brake cylinder to effect an application of the brakes, electroresponsive means operated according to the degree of energization thereof for controlling the degree of effectiveness of the pressure of fluid supplied to said brake cylinder, means for establishing a circuit through which current is supplied to energize said electroresponsive means, and a switch device operated upon a decrease in pressure to effect opening of said circuit.

13. In a vehicle brake system, in combination, a brake cylinder, means for supplying fluid under pressure to said brake cylinder to effect an application of the brakes, electroresponsive means operated according to the degree of energization thereof for controlling the degree of effectiveness of the pressure of fluid supplied to said brake cylinder, means for establishing a circuit through which current is supplied to energize said electroresponsive means, a switch device operated upon a decrease in pressure to effect opening of said circuit, and a valve device operated upon a release of pressure manually applied thereto to effect a decrease of pressure in said switch device.

14. In a vehicle brake system, in combination, a brake cylinder, means for supplying fluid under pressure to said brake cylinder to effect an application of the brakes, electroresponsive means operated according to the degree of energization thereof for controlling the degree of effectiveness of the pressure of fluid supplied to said brake cylinder, means for establishing a circuit through which current is supplied to energize said electroresponsive means, a switch device operated upon a decrease in pressure to effect opening of said circuit, and safety control means for controlling the pressure in said switch device.

15. In a vehicle brake system, in combination, a brake cylinder having a piston subject on one side to pressure of fluid supplied to a first chamber and subject on the other side to pressure of fluid supplied to a second chamber, manually operated means for effecting a supply of fluid under pressure to said first chamber, automatic valve means for also effecting a supply of fluid under pressure to said first chamber, electroresponsive valve means operable when energized to effect a supply of fluid under pressure to said second chamber, a normally charged pipe, and means operated upon a decrease of pressure in said pipe for effecting deenergization of said electroresponsive valve means.

16. In a vehicle brake system, in combination, a brake cylinder, an electrodynamic brake device, manually operated means for establishing an incomplete circuit which when completed effects the operation of said electrodynamic brake device, means operable at a predetermined brake cylinder pressure for completing said circuit, and a switch device operated upon a decrease in pressure for effecting opening of the circuit.

17. In a vehicle brake system, in combination, electric brake means, a fluid pressure operated brake device for operating a friction brake, means operable to effect a service application of the brakes, electroresponsive valve means operable during a service application of the brakes to suppress the operation of said fluid pressure operated brake device so long as the electric brake means is effective, means operable to effect an emergency application of the brakes, and means operated in response to operation of said last means for rendering said electric brake means ineffective and said fluid pressure operated brake device effective to operate said friction brake.

18. In a vehicle brake system, in combination, electric brake means, a fluid pressure operated brake device for operating a friction brake, manually operated means operable when in application position to effect a supply of fluid under pressure to said fluid pressure operated brake device, means operated at a predetermined pressure of fluid supplied to said brake device for effecting operation of said electric brake means, and means responsive to operation of said electric brake means for controlling the degree to which said fluid pressure operated brake device operates said friction brake.

19. In a vehicle brake system, in combination, electric brake means, a fluid pressure operated brake device for operating a friction brake, manually operated means operable when in application position to effect a supply of fluid under pressure to said fluid pressure operated brake device, means operated at a predetermined pressure of fluid supplied to said brake device for effecting operation of said electric brake means, means responsive to operation of said electric brake means for controlling the degree to which said fluid pressure operated brake device operates said friction brake, a normally charged pipe, and means operated upon a reduction of pressure in said pipe for causing said electric brake means to be cut out of action and said fluid pressure operated brake device to operate said friction brake to produce a maximum braking effect.

20. In a vehicle brake system, in combination, electric brake means, a fluid pressure operated brake device, means for effecting operation of said electric brake means to produce a braking effect, the braking effect produced by said electric brake means diminishing as the speed of rotation of the vehicle wheels diminishes, means for suppressing the degree of operation of said fluid pressure operated brake device so long as said electric brake means is effective, and operable to increase the degree of operation of said fluid pressure operated brake device when the effectiveness of said electric brake means diminishes, and means effective when the diminution of the electric braking effect is due to wheel slipping for delaying the increase in the degree of operation of said fluid pressure operated brake device.

21. In a vehicle brake system, in combination, electric brake means, a brake cylinder, means for effecting a supply of fluid under pressure to said brake cylinder, manually operated brake controlling means for establishing an incomplete circuit which when completed effects the operation of said electric brake means, and means operable at a predetermined brake cylinder pressure for completing said circuit.

22. In a vehicle brake system, in combination, a dynamic brake device, a brake cylinder, means for effecting a supply of fluid under pressure to said brake cylinder, manually operated brake controlling means for establishing an incomplete circuit which when completed comprises a dynamic brake circuit for said dynamic brake device, and a switch device operable at a predetermined brake cylinder pressure for completing said circuit.

23. In a vehicle brake system, in combination, dynamic brake means, a brake cylinder for operating a friction brake, means for effecting a supply of fluid under pressure to said brake cylinder, means for establishing a dynamic brake circuit for said dynamic brake means, a relay operable when energized to complete said circuit, and a switch device operable at a predetermined brake cylinder pressure for energizing said relay.

24. In a vehicle brake system, in combination, a fluid pressure operated brake operating device, means for supplying fluid under pressure to said device to effect an application of the brakes, and an electroresponsive means having an energizable winding and a pressure responsive element which is unaffected by or unresponsive to the pressure in said brake operating device supplied by said supply means, for controlling the effectiveness of said brake operating device according to the balance of opposing forces produced by said winding when energized and control fluid pressures acting on said pressure responsive element.

25. In a vehicle brake system, in combination, a fluid pressure operated brake operating device, means for supplying fluid under pressure to said device to effect an application of the brakes, electroresponsive means having an energizable winding and a pressure responsive element subject to fluid pressures which are different from and independent of the fluid pressures established by said aforementioned supply, for controlling the effectiveness of said brake operating device according to the balance of opposing forces produced by said winding when energized and the fluid pressures acting on said pressure responsive element, electrodynamic brake means, and means for energizing said electroresponsive means according to the effectiveness of said electrodynamic brake means.

JOSEPH C. McCUNE.